United States Patent Office.

IMPROVED MEDICAL COMPOUND.

DAVID W. STUTSMAN, OF UPSHUR, OHIO.

*Letters Patent No. 59,803, dated November 20, 1866.*

SPECIFICATION.

TO ALL WHOM IT MAY CONCERN:

Be it known that I, DAVID W. STUTSMAN, of Upshur, Preble county, Ohio, have invented a new and useful composition for the cure of bilious derangement, which composition I call Fever and Ague Pills.

I take equal weights of butternut bark and Cayenne pepper, and, having reduced them to a fine powder, blend them intimately with twice their united weight of beef's gall. This mixture I place in a stone jar immerse said jar in cold water, which I raise to the boiling point and continue to boil until the mixtur assumes the consistency of thin dough or paste. I then add of sweet oil sufficient to enable the mixture to b worked and made up into pills of about the size of a garden pea.

I claim the composition for a fever and ague pill, composed and compounded as set forth.

In testimony of which invention I hereunto set my hand.

DAVID W. STUTSMAN.

Witnesses:
GEO. H. KNIGHT,
JAMES H. LAYMAN.